United States Patent
Wisløff et al.

(10) Patent No.: US 9,897,712 B2
(45) Date of Patent: Feb. 20, 2018

(54) METHOD OF ACQUIRING GHOST-FREE SIGNATURES FOR BROADBAND SOURCE CALIBRATION

(71) Applicant: PGS Geophysical AS, Oslo (NO)

(72) Inventors: Jens Fredrik Barra Wisløff, Oslo (NO); Daniel Barker, Verk (NO)

(73) Assignee: PGS Geophysical AS, Oslo (NO)

( * ) Notice: Subject to any disclaimer, the term of this patent is extended or adjusted under 35 U.S.C. 154(b) by 405 days.

(21) Appl. No.: 14/585,468

(22) Filed: Dec. 30, 2014

(65) Prior Publication Data
US 2016/0109601 A1   Apr. 21, 2016

Related U.S. Application Data

(60) Provisional application No. 62/066,168, filed on Oct. 20, 2014.

(51) Int. Cl.
*G01V 1/00*   (2006.01)
*G01V 1/38*   (2006.01)
*G01V 1/36*   (2006.01)

(52) U.S. Cl.
CPC .............. *G01V 1/3817* (2013.01); *G01V 1/36* (2013.01); *G01V 1/3808* (2013.01); *G01V 1/3861* (2013.01); *G01V 1/364* (2013.01); *G01V 2210/56* (2013.01)

(58) Field of Classification Search
CPC ...... G01V 1/36; G01V 1/3808; G01V 1/3817; G01V 1/3861; G01V 1/364; G01V 2210/56
See application file for complete search history.

(56) References Cited

U.S. PATENT DOCUMENTS

| | | | |
|---|---|---|---|
| 6,944,094 B1 * | 9/2005 | Thomsen | G01V 1/48 367/25 |
| 2007/0258322 A1 * | 11/2007 | Hopperstad | G01V 1/006 367/23 |
| 2013/0077436 A1 * | 3/2013 | Soubaras | G01V 1/3808 367/24 |

(Continued)

OTHER PUBLICATIONS

J.F. Wisloff et. al. "Calibrated airgun source modeling to estimate broadband marine source signatures", in the 84th Annual Meeting of Society of Exploration Geophysicists (SEG), Oct. 2014.

(Continued)

*Primary Examiner* — Krystine E Breier
(74) *Attorney, Agent, or Firm* — Patterson & Sheridan, LLP

(57) ABSTRACT

Embodiments described herein provide a method for acquiring de-ghosted data that can be utilized for calibration of a seismic source (air gun) model. Positions of a plurality of seismic receivers can be determined to enable efficient removal of an interference effect of ghost signals originating from mirrored versions of at least one seismic source that are received at the plurality of seismic receivers (hydrophones). Data (de-ghosted or near de-ghosted) can be acquired from the plurality of seismic receivers located at the determined positions by operating the at least one seismic source. A calibrated model of the at least one seismic source can be prepared based on the acquired (de-ghosted) data.

22 Claims, 13 Drawing Sheets

(56) References Cited

U.S. PATENT DOCUMENTS

2015/0003195 A1* 1/2015 Widmaier ............ G01V 1/3817
367/16
2015/0316671 A1* 11/2015 Willis .................... G01V 1/303
367/25

OTHER PUBLICATIONS

Hegna, S. and Parkes, G., The Principle of Using Complementary Acquisition Components to Achieve Broadband Seismic SEG 2012.
Posthumus, BJ., Deghosting Using a Twin Streamer Donfiguration, Geophysical Prospecting 41,267-286, 1993.

* cited by examiner

| ELEMENT | VALUE |
|---|---|
| NUMBER OF FARFIELD HYDROPHONES | 6 |
| NUMBER OF NEAR FIELD HYDROPHONES | 2 |
| ABSOLUTE HYDROPHONE ACCURACY | 3.0 dB |
| RELATIVE HYDROPHONE ACCURACY | 0.1 dB |
| HYDROPHONE SENSITIVITY RANGE | 180 dB |
| HYDROPHONE FREQUENCY RANGE | 1 Hz - 20 kHz |
| RECORDING SAMPLE RATE | 0.025 ms |
| RECORDING LENGTH | 4 sec |

FIG. 8

| HYDROPHONE | x [m] | y [m] | z [m] |
|---|---|---|---|
| NF1 | 0,00 | 0,00 | Ds + 1,00 |
| NF2 | 0,00 | 1,00 | Ds |
| FF1 | 5,00 | 0,00 | 4,00 |
| FF2 | 5,00 | 0,00 | 6,50 |
| FF3 | 5,00 | 0,00 | 9,00 |
| FF4 | 5,00 | 0,00 | 13,00 |
| FF5 | 5,00 | 0,00 | 30,00 |
| FF6 | 5,00 | 0,00 | 70,00 |

FIG. 9

| GUN CONFIGURATION | VALUE |
|---|---|
| VOLUME | Full range, All |
| DEPTH (m) | 3, 6, 10, 15 |
| FIRING PRESSURE (psi) | 2000, 2500 |
| CLUSTERS | Standard conf, test conf |
| ADDITIONAL SETUP PARAMETERS | All valid setups, test setups |

FIG. 10

METHOD OF ACQUIRING GHOST-FREE SIGNATURES FOR BROADBAND SOURCE CALIBRATION

CROSS-REFERENCE TO RELATED APPLICATIONS

This application claims benefit of U.S. Provisional Patent Application Ser. No. 62/066,168, filed Oct. 17, 2014, entitled "Method of Acquiring Ghost-Free Signatures for Broadband Air Gun Calibration", which is incorporated herein by reference.

BACKGROUND

This disclosure is related generally to the field of geophysical surveying, and more specifically to acquiring ghost-free or near-ghost free data. The disclosure may have applications in the field of broadband source calibration. The disclosure may have benefit when applied to marine surveying operations.

A signature of a seismic source (e.g., an air gun or an air gun array) can be modeled using conventional approaches. Such modeling can be used to indentify noise components when the seismic source is used to perform a seismic survey. However, the advent of broadband marine seismic solutions unveils limitations in conventional modeling approaches outside the marine seismic bandwidth.

While a farfield signature of an air gun array can be modeled using approaches based on Rayleigh's theory of oscillating bubbles, broadband marine seismic solutions may unveil limitations in modeling algorithms outside marine seismic bandwidth. There are several reasons for this that can stem from implementations of source modeling procedures.

Conventional approaches to source modeling may fail to take into account higher frequencies. For example, in many cases the Digital Field System V (DFS-V) Out-128 (72) Hz (decibel/octave) filter may be used for filtering to compare measured and modeled signatures of an air gun. As a consequence, models calibrated according to this approach may not perform outside the frequency range of the DFS-V filter. Measured signatures that were used for calibration could include a source ghost, which could mask frequency ranges depending on a depth of a shot from a seismic source (e.g., an air gun). Within these masking limits, modeling schemes may be devised that could match array signatures well enough to be used in de-signature applications.

As interest in wider frequency ranges grows, the previously masked information can become useful. Modeled signatures that depend on filter systems with a defined calibration range can become less reliable outside the calibration range. Approaches to broaden the applicable frequency range beyond conventional calibration ranges include both calibrating over a broader bandwidth, as well as improving the underlying model such that deviations from calibrated values can be handled.

Marine seismic air gun modeling can be, for example, based on the dynamics of an oscillating air bubble created by an underwater explosion. Some energy loss during the bubble oscillation can be due to mass transfer inside the bubble. As the bubble oscillates, water may evaporate at the bubble wall and condense inside the bubble to produce a transfer of mass of water into the bubble, causing the dampening exhibited in bubble pulses of an air gun signature. The exact rate at which these processes work can be difficult to describe theoretically due to strong variations of temperature and pressure inside the air bubble. As a result, observed rates can be used as calibration in order to make modeled signatures fit recorded data. This may be sufficient for a good fit with a specific (narrow) bandwidth specification; however, it may not be accurate enough for modeling of broadband signatures.

Other physical effects may contribute to differences between measured and modeled signatures. Such effects can be part of the source modeling theory. This can include a realistic model of air escaping from a seismic source (e.g., an air gun) to describe the shape of a primary pulse, and upward movement of the bubble due to buoyancy. As longer time signatures are used for processing, effects of upward movement of the bubble due to buoyancy can be increasingly important.

There may also be high-frequency effects that are not directly reproducible, such as cavitation. While such noise may not be especially relevant in a broadband frequency range, it may be beneficial for purposes such as modeling environmental effects.

In addition to the dynamics of each air bubble, seismic sources (e.g., air guns) may also interact with each other. While some interaction between air guns can be known, the case of clusters, for example, where air bubbles of two or more air guns coalesce, may be less clear. Two-gun clusters have been researched and can be used in array designs. However, in searching for low frequencies, hyperclusters, which are beyond the scope of both the original model and the original calibration of existing modeling algorithms, may be used.

Therefore, higher accuracy in modeling seismic source signatures is desired.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8 is a table of example specifications for seismic receivers, in accordance with embodiments of the present disclosure.

FIG. 9 is a table of positions for seismic receivers, in accordance with embodiments of the present disclosure.

FIG. 10 is a table of example specifications for seismic sources, in accordance with embodiments of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
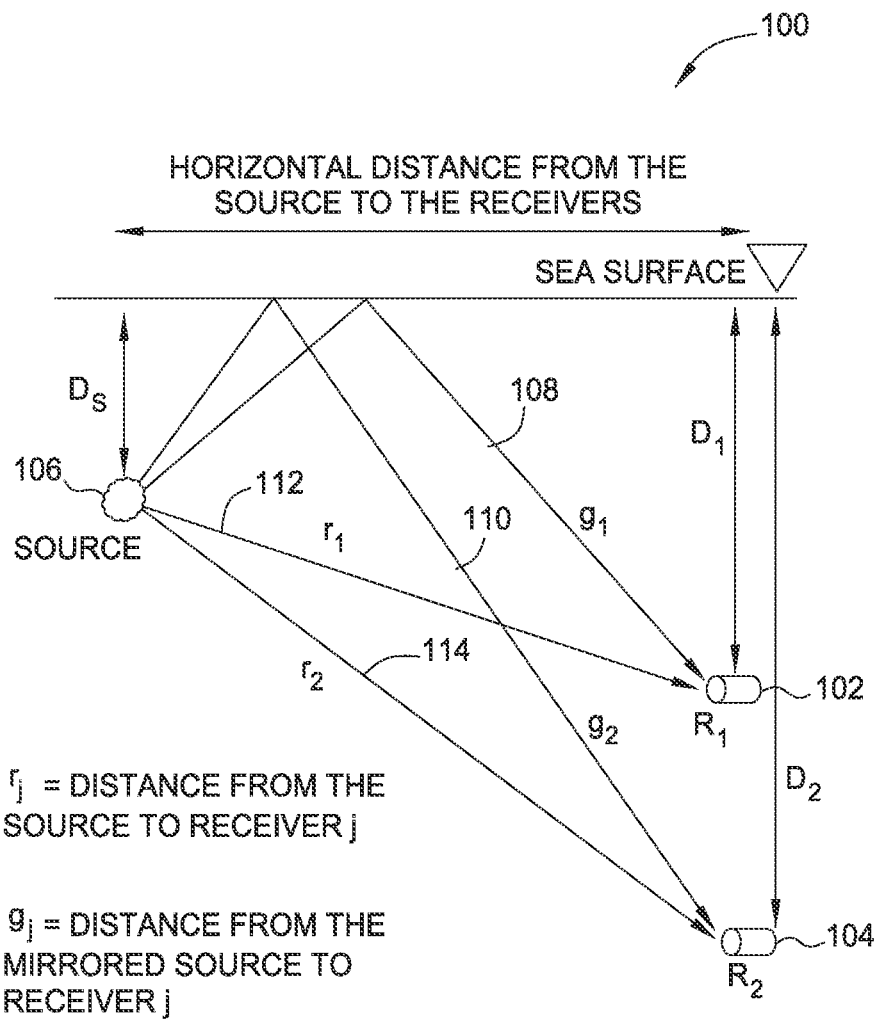
FIG. 1 is an example setup diagram that allows for acquiring data from which interference effects may be efficiently removed, in accordance with embodiments of the present disclosure.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected, either physically or operatively.

This disclosure is related generally to the field of marine surveying. Marine surveying can include, for example, seismic and/or electromagnetic surveying, among others. For example, this disclosure may have applications in marine surveying, in which one or more sources are used to generate wave-fields, and sensors—either towed or ocean bottom—receive energy generated by the sources and affected by the interaction with the subsurface formation.

As would be understood by one of ordinary skill in the art with the benefit of this disclosure, embodiments and advantages described herein with reference to a "streamer" might be equally achievable and advantageous when used with a marine geophysical prospecting ocean bottom cable. Consequently, as used herein, "streamer" should be read to refer equally to a towed sensor cable as well as to an ocean bottom sensor cable.

Embodiments of the present disclosure can include methods, apparatus, and machine-readable media for acquiring ghost-free or near-ghost-free signatures for broadband seismic source calibration. Some embodiments can include a non-transitory machine-readable medium storing instructions executable by a processing resource to cause a machine to determine positions of a plurality of seismic receivers (e.g., hydrophones) to enable removal of an interference effect of ghost signals originating from mirrored versions of at least one seismic source (e.g., air gun or acoustic oscillator) that are received at the plurality of seismic receivers, acquire data from the plurality of seismic receivers located at the determined positions by operating the at least one seismic source, and prepare a calibrated model of the at least one seismic source based on the acquired data.

Some embodiments of the present disclosure can include a method for determining positions of a plurality of seismic receivers (e.g., hydrophones) to enable removal of an interference effect of ghost signals originating from mirrored versions of at least one seismic source (e.g., air gun or acoustic oscillator) that are received at the plurality of seismic receivers, acquiring data from the plurality of seismic receivers located at the determined positions by operating the at least one seismic source, and preparing a calibrated model of the at least one seismic source based on the acquired data.

Some embodiments of the present disclosure can include a marine seismic source calibration assembly comprising: a first sensor cable and a second sensor cable, at least one seismic source (e.g., air gun or acoustic oscillator) attached to the first sensor cable, and an array of seismic receivers (e.g., array of hydrophones) attached to the second sensor cable. According to embodiments of the present disclosure, positions of the seismic receivers (e.g., hydrophones) in the array can be (pre-)determined to enable removal of a predicted interference effect of ghost signals originating from mirrored versions of the at least one seismic source that are received at the array of seismic receivers (e.g., array of hydrophones).

According to embodiments of the present disclosure, a seismic source can be an air gun or an acoustic oscillator. In some embodiments, an array of seismic sources can comprise an array of air guns or an array or acoustic oscillators. According to embodiments of the present disclosure, a seismic receiver can be a hydrophone. In some embodiments, an array of seismic receivers can comprise an array of hydrophones.

Some embodiments of the present disclosure include an acquisition setup which can allow for de-ghosting measured seismic data, and using the de-ghosted seismic data as a basis for calibration of a seismic source model. In some embodiments, de-ghosting can be achieved by applying a de-ghosting operator, for example, the Posthumus de-ghosting operator. The Posthumus de-ghosting operator can be utilized with data that is acquired from two or more seismic receivers which have complimentary ghost wave functions in the frequency domain (e.g., complementary amplitude responses in the frequency domain). In some embodiments, three or more seismic receivers can be used to promote the ghost wave functions as being complimentary within a typical frequency range of seismic data (e.g., the frequency range of 0-250 hertz (Hz)).

FIG. 1 illustrates an example setup diagram 100 that allows for acquiring data from which interference effects may be efficiently removed, in accordance with embodiments of the present disclosure. A plurality of high accuracy seismic receivers (e.g., hydrophones 102, 104 in FIG. 1)

may be positioned relative to each other and to a seismic source 106 to enable efficient removal of an interference effect originating from ghost wave signals (e.g., signals 108, 110 received from mirrored seismic sources or reflections from a sea surface). According to embodiments of the present disclosure, positions of the plurality of seismic receivers in FIG. 1 may be adjusted to achieve desirable distribution of notches of ghost wave functions in the frequency domain corresponding to each source-receiver pair. In some embodiments of the present disclosure, the notches of the ghost wave functions may represent amplitude responses over (narrow) bands of a frequency spectrum where strengths (amplitudes) of desirable signal components are below a threshold due to the interference effect originating from the ghost wave signals.

For example, the positions of the plurality of seismic receivers may be adjusted based on avoiding overlapping of ghost notches of ghost wave functions of different source-receiver pairs, since ghost notches may be directly related to strongest interference effects from the ghost wave signals (e.g., the signals 108, 110 in FIG. 1). In some embodiments of the present disclosure, the plurality of seismic receivers may be vertically aligned below a sea surface, i.e., a horizontal distance from the seismic source 106 to any of the plurality of seismic receivers may be the same, as illustrated in FIG. 1.

According to embodiments of the present disclosure, an amplitude response in the frequency domain of a ghost wave function can be dependent on the travel time difference and the travel time ratio between a direct pressure wave from a seismic source to a seismic receiver (e.g., a pressure wave 112 or 114 in FIG. 1) and a pressure wave that has been reflected by a sea surface (i.e., a pressure wave from a mirrored version of the seismic source, such as the pressure wave 108 or 110 in FIG. 1) to the seismic receiver. The travel time difference can depend on a position of a seismic receiver relative to a position of a seismic source. In this regard, according to embodiments of the present disclosure, de-ghosting can be improved based on, for example, adjustment of positions of seismic receivers to reduce interference between the direct wave and the reflected wave.

Figure 2:
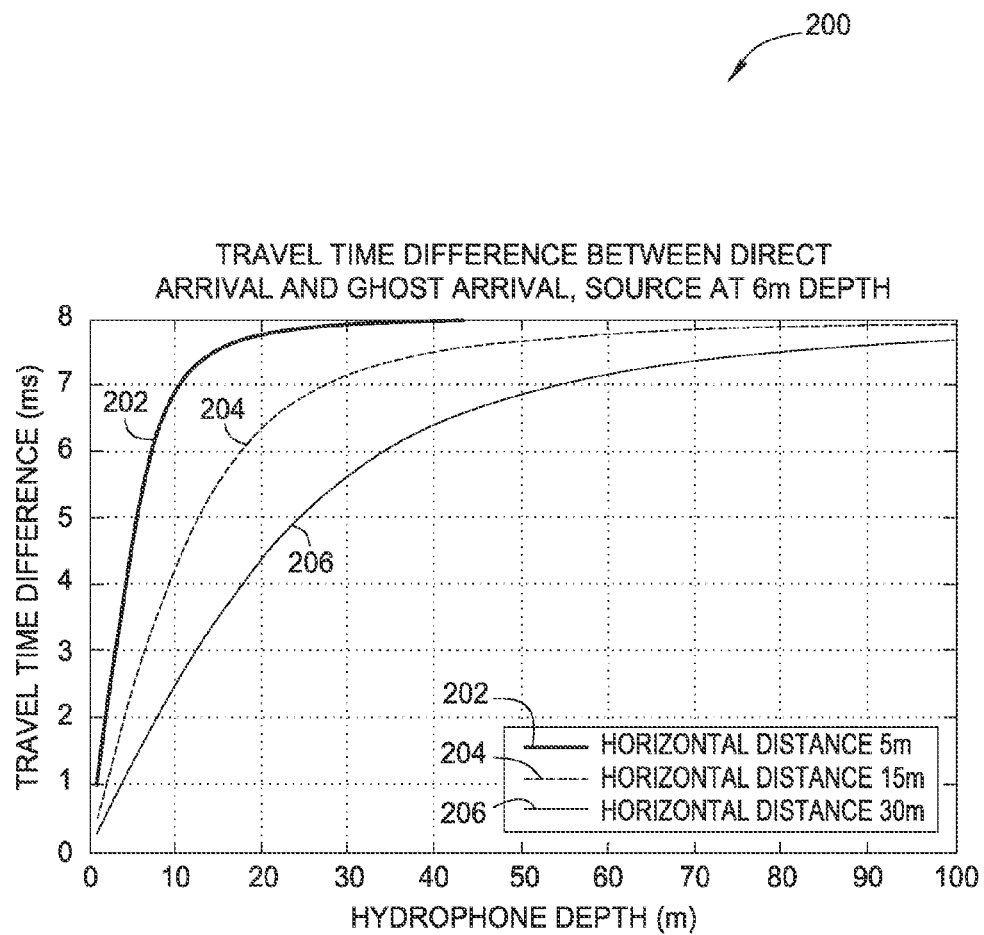
FIG. 2 is a graph of travel time difference between a direct wave arrival and a ghost wave arrival for a seismic source at a specific depth, varying seismic receiver depths, and for different horizontal distances between the seismic source and the seismic receivers, in accordance with embodiments of the present disclosure.

If a plurality of seismic receivers are configured in a vertical array (i.e., the plurality of seismic receivers have an identical horizontal distance from the seismic source, as illustrated in the acquisition setup 100 in FIG. 1), the spread of travel time differences can behave as illustrated in an graph example 200 in FIG. 2. FIG. 2 illustrates the graph 200 of travel time difference between a direct wave arrival and a ghost wave arrival for a single seismic source (e.g., the seismic source 106 in FIG. 1) at a specific depth (e.g., a depth $D_s$ of the seismic source in FIG. 1 is 6 meters), varying seismic receiver (hydrophone) depths, and for 5, 15, or 30 meter horizontal distance (plots 202, 204 and 206, respectively) between the seismic source and the seismic receivers.

As illustrated in FIG. 2, the travel time difference between the direct wave arrival and the ghost wave arrival may depend on both a depth of the seismic receiver and a horizontal distance between the seismic source and the seismic receiver. Typically, as illustrated in FIG. 2, the travel time difference may increase when a depth of the seismic receiver increases. In addition, as also illustrated in FIG. 2, for a specific depth of seismic receiver, the travel time difference may be larger for a smaller horizontal difference between the seismic source and the seismic receiver.

Figure 3:
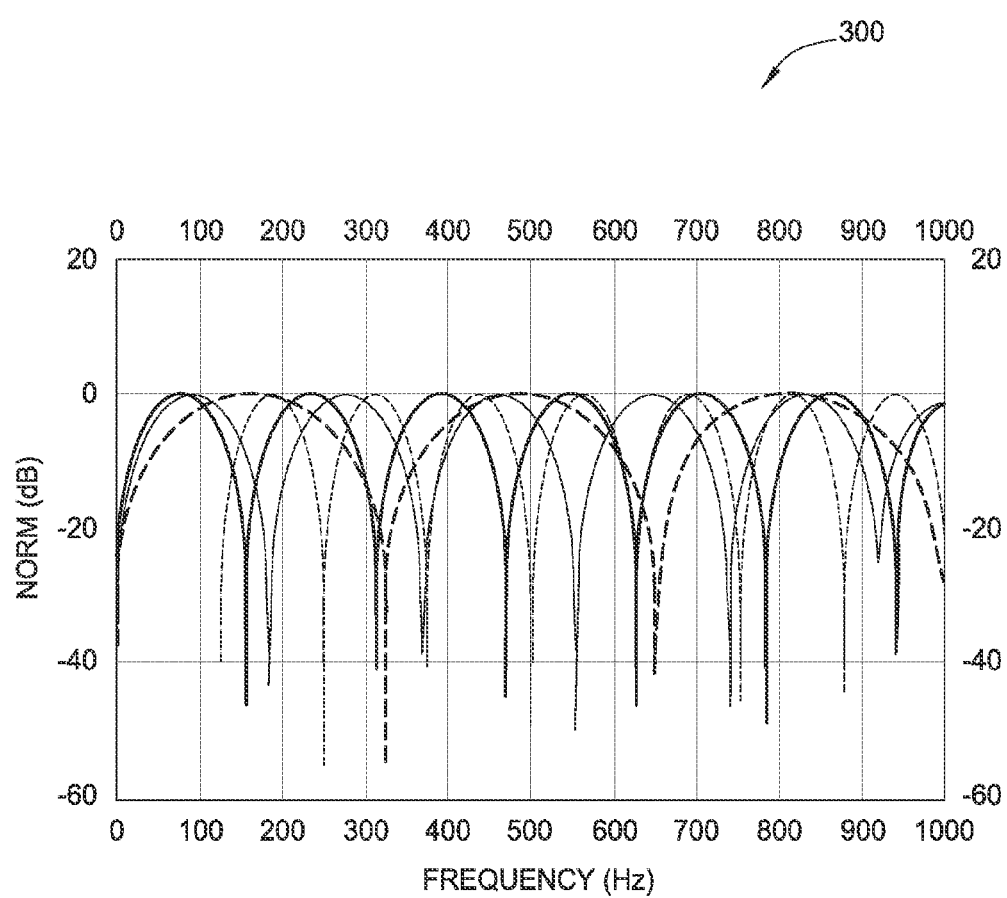
FIG. 3 is a graph of complementary ghost wave functions in the frequency domain with a plurality of seismic receivers located at different depths and at a same horizontal distance from a seismic source with a pre-determined seismic source depth, in accordance with embodiments of the present disclosure.

Given a horizontal distance between a seismic source and a seismic receiver, (vertical) depths of a plurality of seismic receivers can be selected such that the aforementioned travel time differences result in complementary ghost wave functions, as illustrated in an example graph 300 in FIG. 3. In accordance with embodiments of the present disclosure, FIG. 3 illustrates the graph 300 of complementary amplitude responses in the frequency domain of ghost wave functions associated with four seismic receivers at, for example, 4.5, 10, 14, and 100 meter depths, and for a horizontal distance from the seismic source of 10 meters with a depth of the seismic source of 6 meters.

As illustrated in FIG. 3, the complementary amplitude responses in the frequency domain of ghost wave functions can provide that a deep notch of one ghost wave function associated with one source-receiver pair may be overlapped (in the frequency domain) with largest (or near-largest) amplitude(s) of one or more other ghost wave functions associated with one or more other source-receiver pairs. A deep notch of a ghost wave function for a particular frequency may relate to a strong interference effect of ghost data at that particular frequency. On the other hand, largest (or near-largest) amplitude of a ghost wave function for a specific frequency may relate to a low level of interference effect of ghost data at that specific frequency. By promoting complementary amplitude responses in the frequency domain, a strong interference effect of ghost data at a particular frequency for one seismic receiver located at one position may be mitigated by a high level of strength of direct data of that particular frequency received at another seismic receiver located at another position.

According to embodiments of the present disclosure, It can be beneficial to determine a setup of seismic receivers (i.e., positions of a plurality of seismic receivers for a given position of a seismic source) that maximizes a minimum value (e.g., a minimum value across a range of frequencies associated with seismic data) of an envelope function of ghost wave functions associated with source-receiver pairs by tuning (adjusting) positions of the plurality of seismic receivers. By maximizing the minimum value of the envelope function based on tuning positions of the plurality of seismic receivers, the ghost wave functions associated with all source-receiver pairs may have complementary waveforms, as discussed above.

According to embodiments of the present disclosure, based on maximizing a cost function (e.g., a function related to an envelope function of ghost wave functions), positions of a plurality of seismic receivers may be determined in an effort to enable efficient removal of interference effects of ghost data. In an embodiment of the present disclosure, the cost function may be given by:

$$C = \min_{\omega} \left( \max_{1 \leq j \leq N} \left| 1 - \frac{|r_j|}{|g_j|} e^{-i\omega \frac{|g_j| - |r_j|}{v}} \right| \right), \quad (1)$$

where $r_j$ is a vector (e.g., in 3-D space) from a position of a seismic source to a predicted position of a seismic receiver j of a plurality of seismic receivers N (as, for example, illustrated in the setup 100 in FIG. 1), $g_j$ is a vector (e.g., in 3-D space) from a position of a mirrored version of the seismic source (e.g., see surface) to the (predicted) seismic receiver position j (as illustrated in FIG. 1), w is an angular frequency of data being acquired, and v is an average acoustic wave propagation velocity (e.g., through a water). In some embodiments of the present disclosure, if multiple seismic sources are employed in a setup, N may correspond to a number of source-receiver pairs in the setup.

According to embodiments of the present disclosure, the aforementioned envelope of ghost wave functions for a positioning setup of seismic receivers may be defined as a function of angular frequency ω and given by:

$$E(\omega) = \max_{1 \leq j \leq N} \left| 1 - \frac{|r_j|}{|g_j|} e^{-i\omega \frac{|g_j| - |r_j|}{v}} \right|. \quad (2)$$

Thus, maximizing the cost function defined by equation (1) corresponds to determining the positioning setup of seismic receivers that maximizes a minimum value of the envelope function defined by equation (2) for that positioning setup. The positioning setup of seismic receivers determined by applying this approach may enable the most efficient removal of the interference effects of the ghost data.

In some embodiments of the present disclosure, redundant information, for example to account for uncertainties in positioning of a plurality of seismic receivers, seismic sources, and/or noise (e.g., ghost data), and/or a width of a frequency band of interest, may be provided by increasing a number of seismic receiver positions. In some embodiments, three to ten or more seismic receiver positions may be used.

In some embodiments of the present disclosure, de-ghosted measurements of seismic data may be utilized as a basis for calibrating air gun source modeling. The accuracy of source modeling may be improved when calibration is based on ghost-free or near-ghost-free seismic data.

The seismic (marine) source modeling can be utilized, for example, to identify noise components (signatures) when the seismic source is used to perform a seismic survey to obtain seismic data. Implementations of the marine source modeling can be calibrated and adjusted against measured signatures with a goal of high modeling accuracy within a limited frequency band. However, because multi-component streamers and source de-ghosting can allow for utilization of a broader range of frequencies in seismic imaging, adjustments to the modeling can be beneficial to achieve an accurate match between measured and modeled signatures over an extended frequency band. Examples of beneficial adjustments can include changes to the calibration process, for example, consideration of de-ghosted measurements and avoidance of, for example, traditional Digital Field System V (DFS-V) filtering. In this regard, modeling results after applying calibration can exhibit a match with measured array signatures over a wide frequency range.

Embodiments of the present disclosure can include new broadband calibration of the seismic source model based on newly acquired de-ghosted and unfiltered calibration data. In some embodiments, accurately modeled signatures that can also be used for planning and processing of marine broadband data, such as dual-sensor and multi-level source marine data, can be obtained. In some embodiments, the accurately modeled signatures of marine seismic sources (e.g., array of air guns) together with high accuracy sensors comprising a plurality of seismic receivers (e.g., array of hydrophones) positioned below a sea surface can be utilized in processing of marine broadband data for detecting the subsea geology.

Figure 4:
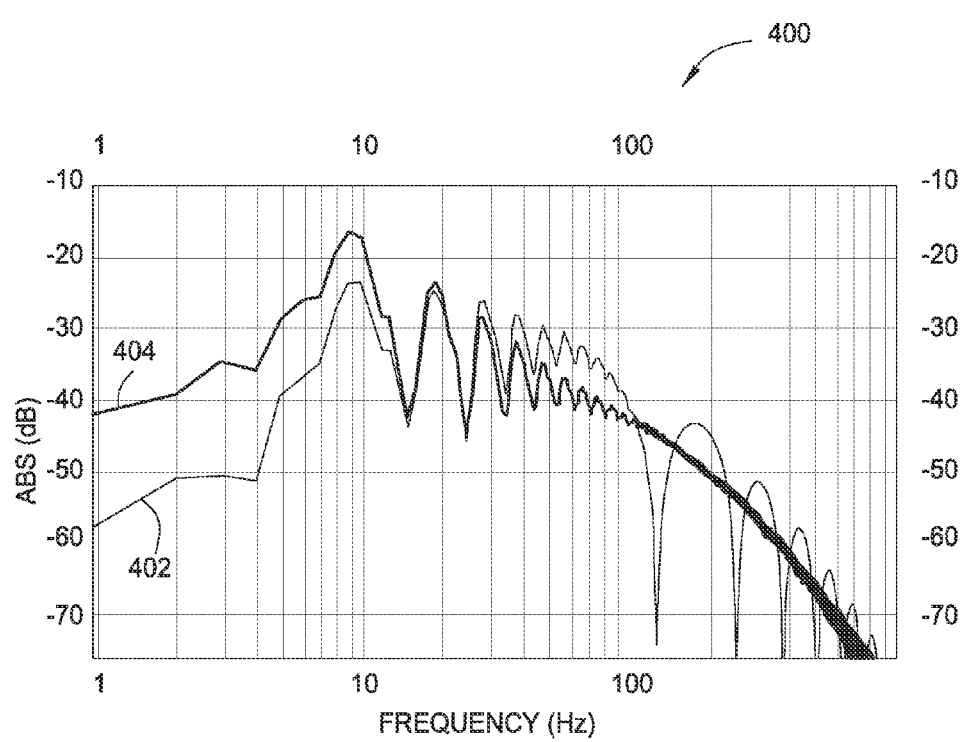
FIG. 4 is a graph comparing a modeled farfield signature from a seismic source array with and without a source-originated ghost signal, both signatures including the effect of source ghost interaction, in accordance with embodiments of the present disclosure.

The presence of a ghost reflection in a farfield signature from a seismic source can conceal information such as the array's response to its own ghost, or the interaction between subarrays. FIG. 4 is an example graph 400 comparing a modeled farfield signature from a seismic source array with a source ghost (plot 402 in FIG. 4) and without a source ghost (plot 404 in FIG. 4), wherein both signatures may include the effect of source ghost interaction, in accordance with embodiments of the present disclosure. As illustrated in FIG. 4, the difference between signatures with and without a source ghost can be more than notches in the frequency spectrum, and can be as prominent in the lower end of the frequency spectrum as for the higher frequencies. Although the interaction effects are of second order, it can be beneficial to take them into account in seismic source calibration schemes.

Therefore, it can be beneficial for broadband source modeling that the modeling algorithm can be calibrated against data without the presence of a source ghost. In this regard, it can be possible to design calibration measurements such that they can allow for an accurate de-ghosting procedure to be applied to the data before calibration.

Awareness of various interaction effects, for example the interaction of the ghost, can be beneficial in ensuring sufficient accuracy in the de-ghosting process. Thus, the de-ghosting process described above may efficiently remove unwanted components (i.e., interference effect originating from the ghost signals) from a seismic frequency spectrum. This de-ghosting approach may avoid utilizing statistical processing steps that aim to (artificially) flatten the frequency spectrum (i.e., to produce frequency responses related to acquired seismic data having amplitude variations within predefined limits) by removing not only unwanted components but also some desirable components. For example, the interaction between seismic sources and subarrays can change the behavior of the seismic sources in the array and can leave footprints in the recorded seismic data, which, however, statistically based processing step(s) may alter or remove completely.

This can have implications for field measurements done for calibration purposes: on one hand it may be beneficial to measure seismic source (air gun) signatures in an as realistic environment as possible (e.g., in sea water at typical source depths); on the other hand, calibration measurements may be carried out in deep water and at a considerable distance from shore in order to avoid reflections from the sea floor or other objects in the relevant part of the signature. Seismic receivers can be located in the farfield, and their locations may need to be determined and adjusted (e.g., based on the approach described above) to allow accurate de-ghosting of the data, i.e., to acquire the data with minimized ghost signatures.

In some embodiments, in order to ensure accurate de-ghosting of the calibration in the presence of unavoidable location inaccuracies, it can be beneficial to receive signals with an array of farfield seismic receivers distributed over different depths and different angles from the seismic source. In this regard, a directional de-ghosting operator can be estimated from the data by inversion. In the case of a directional seismic source (e.g., directional air gun), the estimated operator may be utilized for obtaining a directional model of the directional seismic source. In some embodiments, an array of farfield seismic receivers at various depths and lateral positions can be beneficial for proper de-ghosting of the data, accounting for the uncertainty in exact receiver position when towing. According to embodiments of the present disclosure, by determining positions of farfield seismic receivers in the array based on the approach described above, effectiveness of de-ghosting of the calibration may be enhanced because of a mitigated interference effect of ghost signals received at the array of farfield seismic receivers.

In some embodiments of the present disclosure, a series of calibration measurements of a single seismic source and clustered seismic sources can be conducted for calibration purposes. Such a setup can allow for de-ghosting of the farfield signatures, and the de-ghosted signatures can be used in the calibration process such that a match between modeled and measured signatures over a broad frequency band can be achieved.

Figure 5:
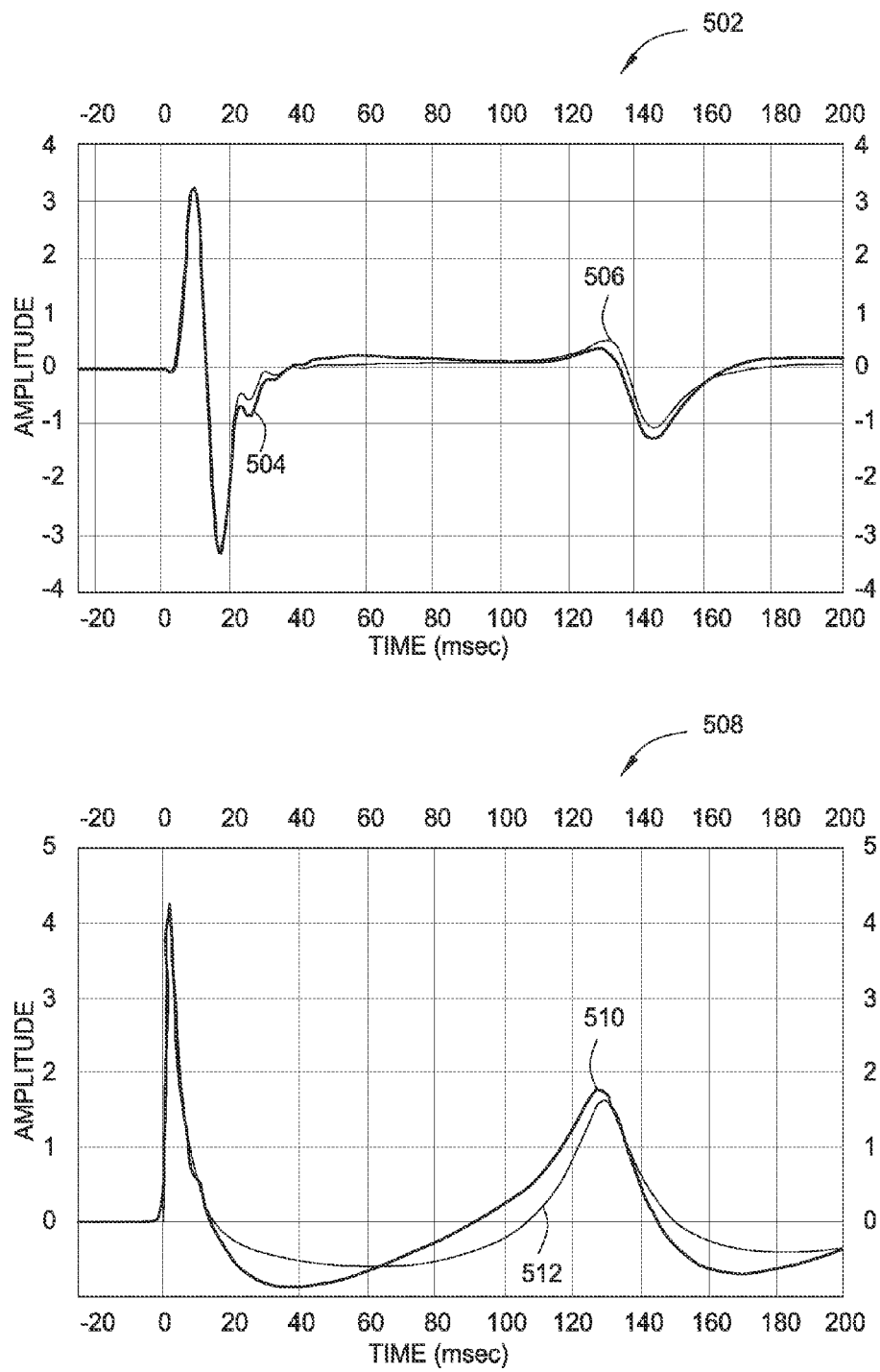
FIG. 5 is a graph comparing measured and modeled signatures of a single seismic source, both including a ghost signal, and both having been filtered, and the same signatures de-ghosted without being filtered, in accordance with embodiments of the present disclosure.

Some examples of signature characteristics that can be difficult to examine by inspecting signatures with a source ghost are illustrated in FIG. 5. FIG. 5 illustrates a graph 502 comparing a measured signature (plot 504) and a modeled signature (plot 506) of a single seismic source, both including a ghost signal, and both having been filtered with the DFS V filter. In addition, FIG. 5 illustrates a graph 508 comparing a measured signature (plot 510) and a modeled signature (plot 512) de-ghosted (e.g., based on the approach discussed above) and without the DFS V filter. As illustrated in the graph 502 in FIG. 5, measured and modeled (e.g., calibrated with a modeling scheme) ghosted and DFS-V filtered signatures (signatures 504 and 506) show a match. However, as illustrated in the graph 508 in FIG. 5, de-ghosted and unfiltered data can reveal differences between measured and modeled signatures (signatures 510 and 512). According to embodiments of the present disclosure, de-ghosting of data based on the approach described above may be combined with calibrating of a seismic source model to achieve a better match between measured and modeled signatures of the seismic source.

Figure 6:
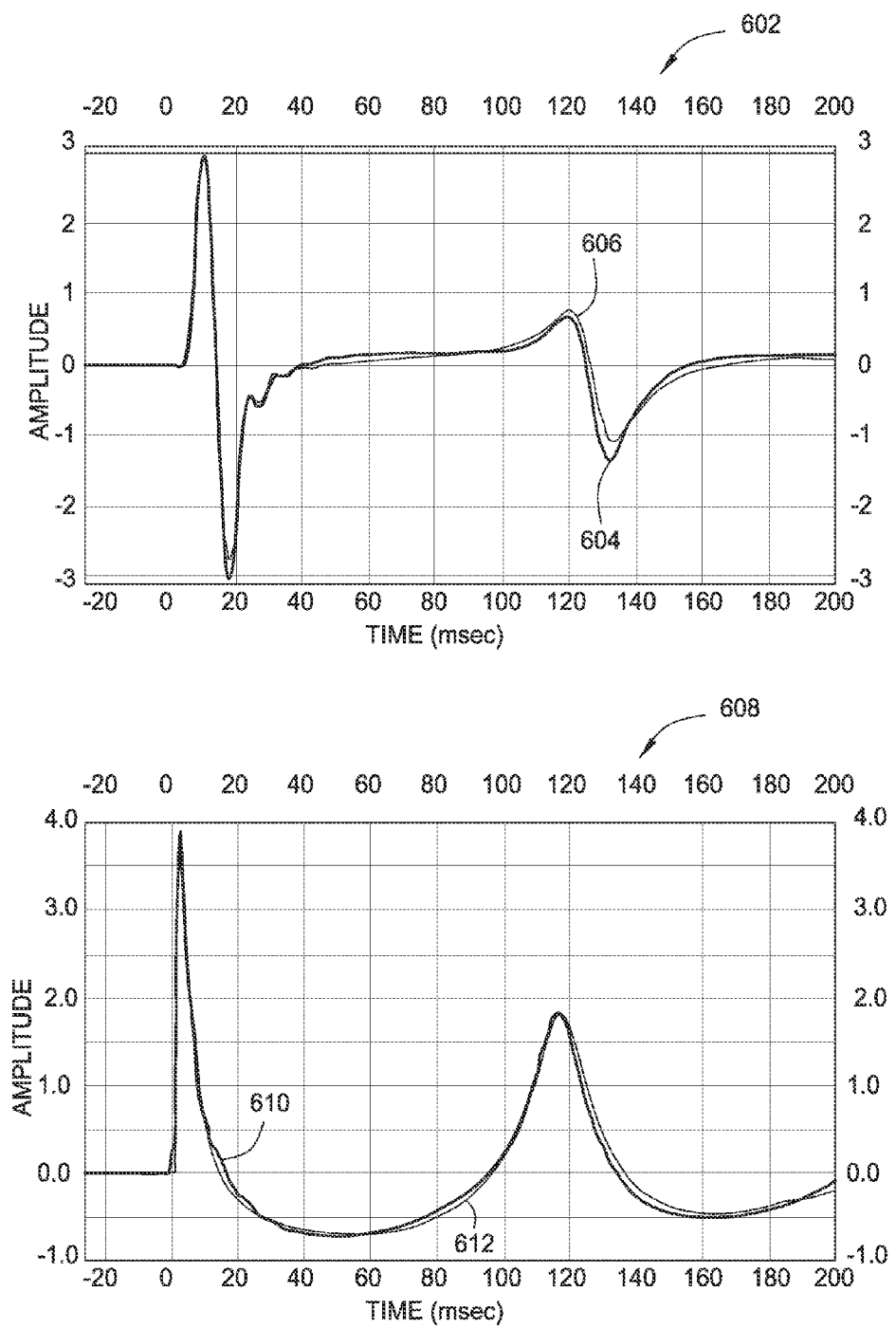
FIG. 6 is a graph comparing measured and recalibrated modeled signatures (e.g., recalibration based on de-ghosted calibration data obtained using methods described herein) of a single seismic source, both including a ghost signal, and both having been filtered, and the same signatures de-ghosted without being filtered, in accordance with embodiments of the present disclosure.

Calibration of a seismic source where de-ghosted calibration data has been utilized is illustrated in FIG. 6. FIG. 6 illustrates a graph 602 comparing a measured signature (plot 604) and a recalibrated modeled signature (plot 606, e.g., the recalibration being based on the de-ghosted calibration data that may be obtained using methods described herein) of a single seismic source, both signatures including a ghost signal, and both having been filtered with the DFS V filter. In addition, FIG. 6 illustrates a graph 608 comparing a measured signature (plot 610) and a recalibrated modeled signature (plot 612) de-ghosted (e.g., based on the approach discussed above) and without the DFS V filter. In this case, the modeled signature 612 may be calibrated towards a de-ghosted unfiltered measurement (e.g., the measured signature 610).

As illustrated in the graph 602 in FIG. 6, the recalibrated modeled signature 604 shows similar accuracy as in the graph 502 in FIG. 5 when being compared with measured data that includes a source ghost and the DFS-V filter (measured signature 606). However, a more accurate match can be observed in the graph 608 when the signatures include neither the source ghost nor the effects of a DFS-V filter (the measured signature 610 and the modeled signature 612). The de-ghosted calibration data utilized for obtaining the measured and modeled signatures shown in the graph 608 in FIG. 6 may be acquired by a plurality of seismic receives located at positions pre-determined according to the method described above.

The difference between measured and modeled signatures (e.g., signatures 510 and 512 in FIG. 5) can arise from the low frequency end which can contain most of the bubble pulse energy. This low-frequency energy can be signal and can contribute to an image if deconvolved. Hence, difficulties related to deconvolving this energy in seismic data can arise from a lack of understanding modeling accuracy in a particular range.

In a full array, interaction effects, and hence a change of resulting pressure output can be larger than for a single seismic source or a cluster of seismic sources. In this regard, it can become beneficial to interpret a modeling result over a broad frequency spectrum.

Figure 7:
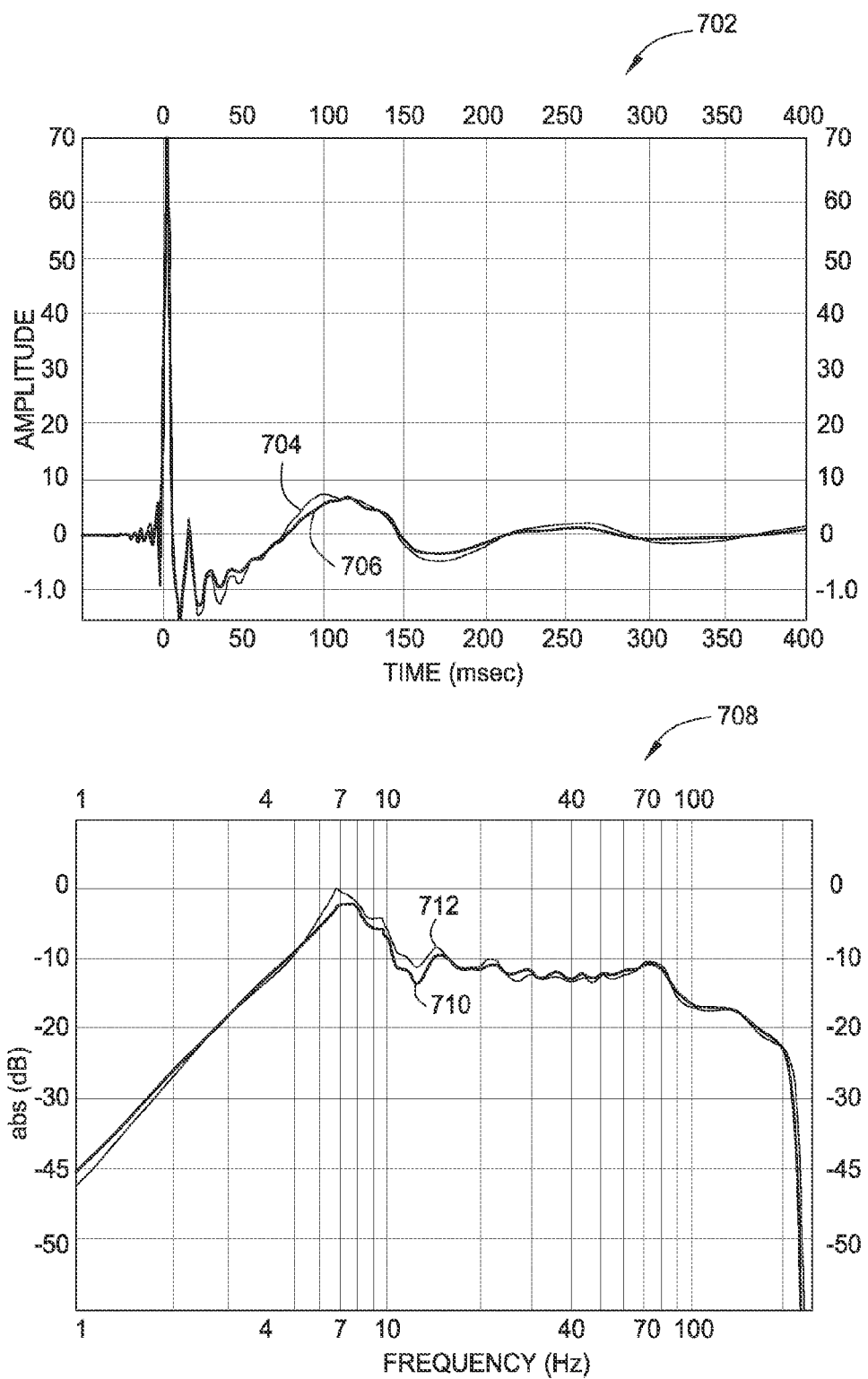
FIG. 7 is a graph comparing measured and modeled signatures for a seismic source array compared in time, frequency and phase, in accordance with embodiments of the present disclosure.
Figure 7:
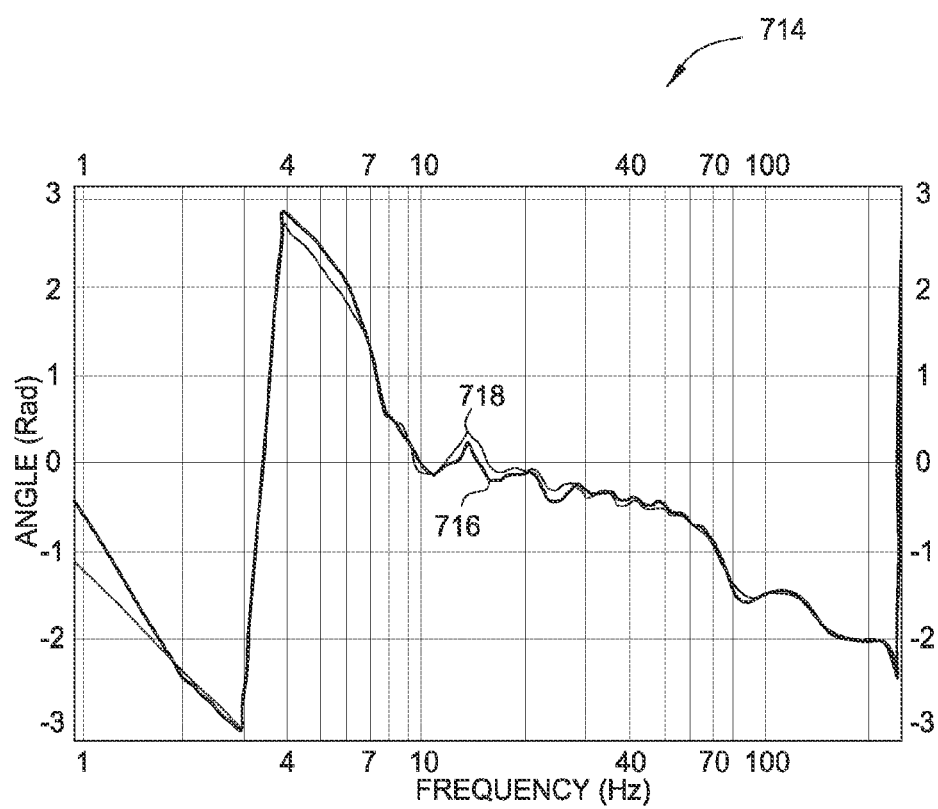

Performance of re-calibrated seismic source (air gun) modeling can be compared to a signature from a farfield measurement of a full 4135 cubic inch array equipped with G. GUN II air guns, for example. FIG. 7 illustrates a graph 702 of a measured signature (plot 704) and a modeled signature (plot 706) for a seismic source (air gun) array compared in amplitude as a function of time; a graph 708 of a measured signature (plot 710) and a modeled signature (plot 712) for the seismic source (air gun) array compared in amplitude as a function of frequency; and a graph 714 of a measured signature (plot 716) and a modeled signature (plot 718) for the seismic source (air gun) array compared in phase as a function of frequency.

Results illustrated in FIG. 7 show the match between modeled and measured signatures. Agreement can be observed in both amplitude and phase below 10 hertz. In some embodiments, a measured signature can be acquired with a 2 millisecond sampling rate and can therefore be limited to a maximum frequency of 200 hertz. In some embodiments, the measured signature can be de-ghosted by deconvolving a ghost function inverted from farfield measurements.

In some embodiments, modeling can be calibrated towards single and clustered air guns, and not all volumes in the 4135 cubic inch array may be included in calibration. In some embodiments, the physics of the air gun modeling can handle interim volumes within the calibrated range, as well as interaction effects without additional tuning to achieve results illustrated in FIG. 7. In some embodiments, air gun modeling can predict relative changes accurately and together with accurate calibration measurements, can accurately model air guns over a broad frequency band, as illustrated in FIG. 7.

In some embodiments of the present disclosure, marine broadband seismic may need higher accuracy in forward-modeling of seismic source (air gun) array signatures compared to other marine seismic. The accuracy of the modeling can be improved by basing the calibration process on broadband calibration data. In some embodiments, it can be beneficial to de-ghost the calibration data by acquiring time- and space-redundant data, which may avoid having acquisition setups with corresponding limiting instrument filters.

In some embodiments, utilizing de-ghosted, unfiltered broadband measurements can improve the validity of the range of modeling, and can provide a match between measured signatures over a broad frequency range. Comparison with a measured, de-ghosted farfield signature can show an increase in the accuracy of the modeling.

In some embodiments, a frequency span of 2-500 hertz can be utilized for broadband seismic applications. However, other spans (e.g., 1-1000 hertz) can be also used. In some embodiments, the frequency range under consideration can extend to 20 kilohertz or beyond.

In some embodiments, measurements can be taken in quiet waters, for example, a fjord or a deep lake. In some embodiments, the depth of the water can be at least 400 meters and measurements can be equidistant from the shore or any sub-surface structure that could act as a reflector. In some embodiments, background noise may not exceed 100 decibels referenced to 1 micropascal.

In some embodiments, a plurality of shots can be made from a seismic source. For example, 20, 30, or more energy emissions (e.g., shots) can be made from the seismic source. In addition, warm-up shots can be made to create stable output from the seismic source between sequences. In some embodiments, noise records can be acquired before and after each shot sequence to monitor the noise level and seismic receiver behavior.

In some cases, it can be difficult to achieve sufficient absolute accuracy of seismic receivers. In some embodiments, measuring the output of a seismic source with a known level of output can relax an absolute accuracy requirement, leaving the strict requirement to only be valid for relative accuracy of seismic receivers.

In some embodiments of the present disclosure, if the aforementioned measurement approach is used, the x-bar hydrophone test can be performed to determine relative sensitivities between the seismic receivers (e.g., hydrophones). The x-bar test can include switching the connections into the acquisition bench to separate the hydrophone/cable variations from other variations. FIG. 8 illustrates a table 800 of example specifications for seismic receivers (e.g., hydrophones) that may be utilized in accordance with embodiments of the present disclosure. As illustrated in FIG. 8, both absolute hydrophone accuracy and relative hydrophone accuracy (e.g., obtained by performing the x-bar test) are specified.

In some embodiments, farfield seismic receivers (e.g., farfield hydrophones) can be placed at different depths with a set horizontal distance to a seismic source. An example of a default setup 900 with the seismic source at x=0, y=0, z=$D_s$ coordinated is illustrated in FIG. 9. Other combinations are possible depending on the local setup and can be determined before field acquisition. In some embodiments, the hydrophone deployment system can achieve a positioning error of no more than 0.5 meters in each direction. In some embodiments, current measurements can allow for correcting positioning bias. In some embodiments, hydrophone configuration can be decoupled from mechanical vibrations of the shooting frame.

In addition to the hydrophones, depth sensors can be included. In some embodiments, at least two depth sensors can be included, for example, one together with a seismic source, and one together with a deepest farfield seismic receiver. A conductivity, temperature, and depth (CTD) measurement can be completed to determine the temperature, salinity, pressure, and/or density in the water from the surface down to the depth of the deepest farfield seismic receiver. In some embodiments, the CTD measurement can be completed at least two times every 24 hours. In addition, a log of the sea state based at least in part on the CTD measurements can be kept.

For different air gun types, each of the different air gun bodies (e.g., different volumes) can be measured both as single guns and in a two-gun cluster configuration with typical cluster separation for the given air gun type and volume. In some embodiments of the present disclosure, a source depth of 6 meters with a firing pressure of 2000 pounds per square inch (psi) can be measured for each selected volume. In addition, a second depth (e.g., 10 meters), and a second pressure (e.g., 2500 psi) can be included. Air guns can be used in special configurations, for example, delta-cluster, hyper-cluster, or large in-line cluster. In some embodiments, air guns can have additional setup parameters, for example, various shuttle settings. Effects of varying these parameters can be measured for different air gun volumes.

FIG. 10 illustrates a table 1000 of example specifications for various test setups for seismic sources, in accordance with embodiments of the present disclosure. In some embodiments, the cluster and additional air gun specific setup can be addressed for each planned acquisition. For example, in one of the setup configurations illustrated in FIG. 10, the full range seismic source (e.g., air gun) volume may be used along with the standard configuration of seismic source (air gun) clusters, the seismic source (air gun) depth is 6 meters (e.g., as disclosed in relation to FIGS. 1-3), and the firing pressure is 2000 psi.

Figure 11:
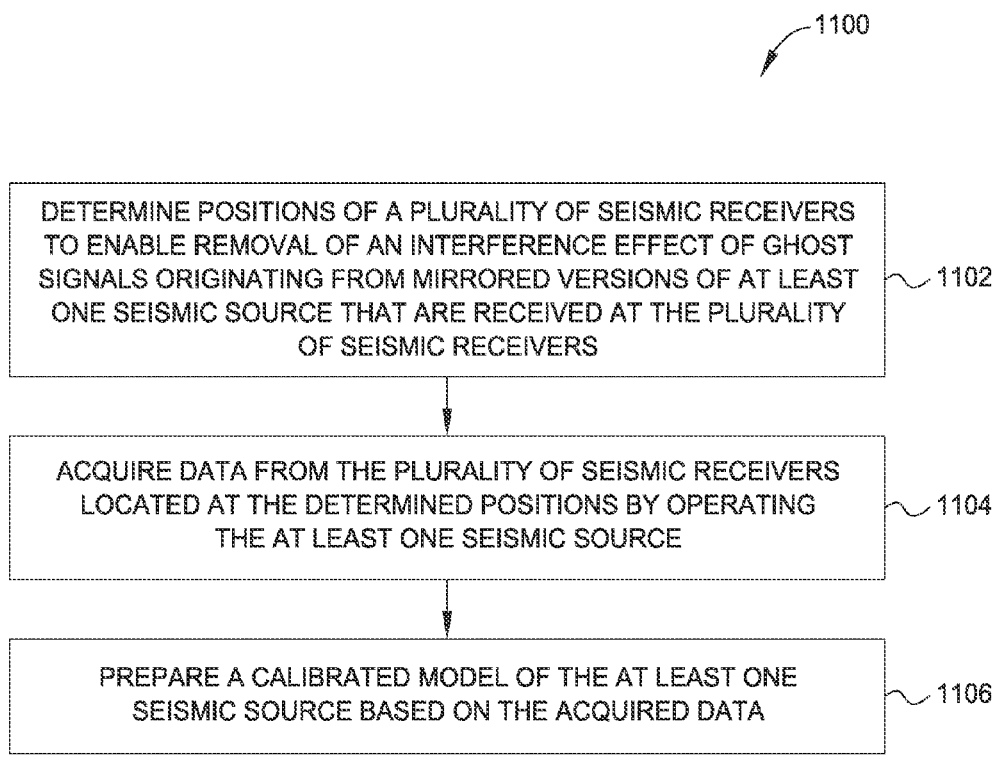
FIG. 11 is a flow diagram summarizing a method of calibrating a model of a broadband seismic source, in accordance with embodiments of the present disclosure.

FIG. 11 is a flow diagram 1100 summarizing a method of calibrating a model of a broadband seismic source (e.g., a broadband air gun), in accordance with embodiments of the present disclosure. At 1102, positions of a plurality of seismic receivers may be determined to enable removal of an interference effect of ghost signals originating from mirrored versions of at least one seismic source that are received at the plurality of seismic receivers. At 1104, data may be acquired from the plurality of seismic receivers located at the determined positions by operating the at least one seismic source. At 1106, a calibrated model of the at least one seismic source may be prepared based on the acquired data.

Figure 12:
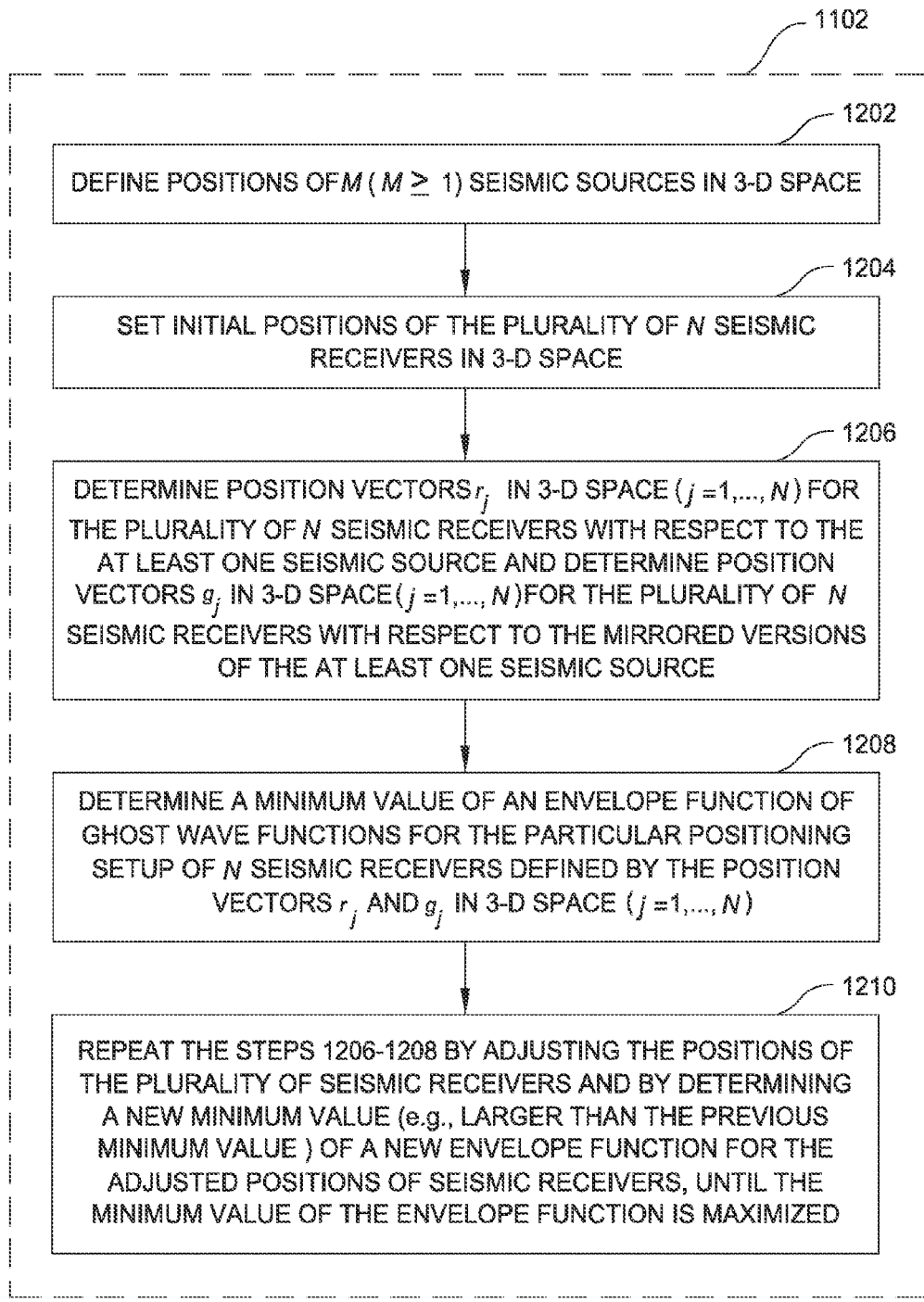
FIG. 12 is a flow diagram summarizing a method of determining positions of a plurality of seismic receivers, in accordance with embodiments of the present disclosure.

According to embodiments of the present disclosure, the positions of the plurality of seismic receivers may be determined, at the step 1102, as illustrated in an example flow diagram in FIG. 12. At 1202, positions of M (M 1) seismic sources may be defined in 3-D space. At 1204, initial positions of the plurality of N seismic receivers may be set in 3-D space. At 1206, position vectors $r_j$ in 3-D space (j= 1, . . . , N) for the plurality of seismic receivers with respect to the at least one seismic source may be determined, and position vectors $g_j$ in 3-D space (j=1, . . . , N) for the plurality of seismic receivers with respect to the mirrored versions of the at least one seismic source may be determined.

At 1208, a minimum value of the envelope function of ghost wave functions for this particular positioning setup of seismic receivers obtained by equation (2) for some value of angular frequency $\omega_{min}$ (within a defined range of angular frequencies w related to data) may be determined. At 1210, the steps 1206 and 1208 may be repeated by adjusting the positions of the plurality of N seismic receivers (i.e., the position vectors $r_j$ and $g_j$, j=1, . . . , N may be adjusted), and by determining a new minimum value (e.g., larger than the previous minimum value) for some value of angular frequency $\omega_{mean}$ of a new envelope function obtained by equation (2) for the adjusted positions of seismic receivers. According to embodiments of the present disclosure, the steps 1206-1208 may be repeated until this minimum value of the envelope function is maximized, i.e., until the cost function defined by equation (1) is maximized. The positioning setup of seismic receivers (i.e., positions of N seismic receivers) determined in this manner may enable most efficient removal of interference effect of the ghost signals originating from the mirrored versions of the at least one seismic source.

According to embodiments of the present disclosure, a minimum overall value of the envelope function defined by equation (2) for a specific angular frequency $\omega$ may relate to a deepest (cumulative) notch of a sum of ghost wave functions for all source-receiver pairs, which may be associated with a strongest interference effect of the ghost signals occurring at that specific angular frequency $\omega$ for a particular positioning setup of seismic receivers. By adjusting the positions of the plurality of seismic receivers to maximize the cost function according to equation (1), the interference effect of the ghost signals may be most efficiently mitigated across the entire range of angular frequencies of data.

According to some embodiments of the present disclosure, as discussed above, determining the positions of the plurality of seismic receivers may comprise adjusting predicted positions of the plurality of seismic receivers in an iterative manner such that differences in travel times between arrivals at the plurality of receivers of direct signals from the at least one seismic source and arrivals at the plurality of receivers of the ghost signals from the mirrored versions of the at least one seismic source result in complementary ghost wave functions associated with the predicted positions of the plurality of seismic receivers (e.g., the complementary ghost wave functions associated with four hydrophones illustrated in FIG. 3).

In some embodiments of the present disclosure, as discussed above, determining the positions of the plurality of seismic receivers may be based on maximizing a cost function. In an embodiment of the present disclosure, the cost function may be related to an envelope function of frequency domain amplitude responses of ghost wave functions associated with predicted positions of the plurality of seismic receivers for a specific position of the at least one seismic source. In an embodiment, the cost function may be defined as given by equation (1).

In some embodiments of the present disclosure, as discussed above, determining the positions of the plurality of seismic receivers to enable removal of the interference effect may comprise selecting initial positions of the plurality of seismic receivers, and converging from the initial positions to the determined positions of the plurality of seismic receivers to enable removal of the interference effect. For example, the converging may be achieved by adjusting positions of the plurality of seismic receivers in an iterative manner to enable (most efficient) removal of the interference effect of ghost signals originating from the mirrored versions of the at least one seismic source.

In an embodiment of the present disclosure, as discussed above, acquiring the data (e.g., ghost-free or near-ghost-free data) may comprise measuring the data by performing a plurality of energy emissions from the at least one seismic source (e.g., at least 20 shots from an array of air guns or at least 20 shots from an air gun if a single air gun is used). In an embodiment, as discussed above, the plurality of seismic receivers located at the determined positions may have an identical horizontal distance from the at least one seismic source, i.e., the plurality of seismic receivers may be vertically aligned and attached to a same rope. In an embodiment, the horizontal distance may comprise a trajectory parallel to a plane tangent to a spherical surface approximating a sea surface, wherein the at least one seismic source and the plurality of seismic receivers may be located below the sea surface. In another embodiment, the plurality of seismic receivers located at the determined positions may be positioned around the at least one seismic source.

In an embodiment of the present disclosure, as discussed above, determining the positions of the plurality of seismic receivers may comprise finding an angular frequency of the data that minimizes a value of an envelope function of frequency domain amplitude responses of ghost wave functions associated with the positions of the plurality of seismic receivers.

Some embodiments of the present disclosure can include a data product that comprises a calibrated model for a seismic source, the calibrated model having been made by the methods described herein. The data product can be transported and/or transmitted within the United States, imported to, or exported from the United States on physical media or by wire or broadcast transmission.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

While the foregoing is directed to embodiments of the present invention, other and further embodiments of the invention may be devised without departing from the basic scope thereof, and the scope thereof is determined by the claims that follow.

The invention claimed is:

1. A method, comprising:
resolving positions of a plurality of seismic receivers to enable removal of an interference effect of ghost signals originating from mirrored versions of at least one seismic source that are received at the plurality of seismic receivers wherein resolving the positions of the plurality of seismic receivers comprises adjusting predicted positions of the plurality of seismic receivers in an iterative manner such that differences in travel times between arrivals at the plurality of receivers of direct signals from the at least one seismic source and arrivals at the plurality of receivers of the ghost signals from the mirrored versions of the at least one seismic source result in complementary ghost wave functions;
acquiring data from the plurality of seismic receivers located at the resolved positions by operating the at least one seismic source; and
preparing a calibrated model of the at least one seismic source based on the acquired data.

2. The method of claim 1, wherein resolving the positions of the plurality of seismic receivers comprises maximizing a cost function.

3. The method of claim 2, wherein the cost function is related to an envelope function of frequency domain amplitude responses of ghost wave functions associated with predicted positions of the plurality of seismic receivers for a specific position of the at least one seismic source.

4. The method of claim 2, wherein the cost function is given by:

$$C = \min_{\omega}\left(\max_{1 \leq j \leq N}\left|1 - \frac{|r_j|}{|g_j|}e^{-i\omega\frac{|g_j|-|r_j|}{v}}\right|\right),$$

wherein $r_j$ is a vector from a position of the at least one seismic source to a predicted position of one of the plurality of seismic receivers, $g_j$ is a vector from a position of a mirrored version of the at least one seismic source to the predicted position of the seismic receiver, $\omega$ is an angular frequency, $v$ is an average acoustic wave propagation velocity, $N$ is a number of the plurality of seismic receivers and $j=1, 2, \ldots, N$.

5. The method of claim 1, wherein resolving the positions of the plurality of seismic receivers to enable removal of the interference effect comprises:

selecting initial positions of the plurality of seismic receivers; and converging from the initial positions to the resolved positions of the plurality of seismic receivers to enable removal of the interference effect.

6. The method of claim 1, wherein acquiring the data comprises:

measuring the data by performing a plurality of energy emissions from the at least one seismic source.

7. The method of claim 6, wherein the plurality of energy emissions comprise at least 20 shots from the at least one seismic source.

8. The method of claim 1, wherein the plurality of seismic receivers located at the resolved positions have an identical horizontal distance from the at least one seismic source, the horizontal distance comprises a trajectory parallel to a plane tangent to a spherical surface approximating a sea surface, the at least one seismic source and the plurality of seismic receivers being located below the sea surface.

9. The method of claim 1, wherein the plurality of seismic receivers located at the resolved positions are positioned around the at least one seismic source.

10. The method of claim 1, wherein resolving the positions of the plurality of seismic receivers comprises:

finding an angular frequency of the data that minimizes a value of an envelope function of frequency domain amplitude responses of ghost wave functions associated with the positions of the plurality of seismic receivers.

11. The method of claim 1, wherein the plurality of seismic receivers comprise at least three seismic receivers.

12. The method of claim 1, wherein the positions of the plurality of seismic receivers are resolved for a specific position of the at least one seismic source.

13. A non-transitory machine-readable medium storing instructions executable by a processing resource to cause a machine to:

resolve positions of a plurality of seismic receivers based on maximizing a cost function to enable removal of an interference effect of ghost signals originating from mirrored versions of at least one seismic source that are received at the plurality of seismic receivers;

acquire data from the plurality of seismic receivers located at the resolved positions by operating the at least one seismic source; and prepare a calibrated model of the at least one seismic source based on the acquired data.

14. The machine-readable medium of claim 13, wherein the cost function is related to an envelope function of frequency domain amplitude responses of ghost wave functions associated with predicted positions of the plurality of seismic receivers for a specific position of the at least one seismic source.

15. The machine-readable medium of claim 13, wherein the cost function is given by:

$$C = \min_{\omega}\left(\max_{1 \leq j \leq N}\left|1 - \frac{|r_j|}{|g_j|}e^{-i\omega\frac{|g_j|-|r_j|}{v}}\right|\right),$$

wherein $r_j$ is a vector from a position of the at least one seismic source to a predicted position of one of the plurality of seismic receivers, $g_j$ is a vector from a position of a mirrored version of the at least one seismic source to the predicted position of the seismic receiver, $\omega$ is an angular frequency, $v$ is an average acoustic wave propagation velocity, $N$ is a number of the plurality of seismic receivers, and $j=1, 2, \ldots, N$.

16. The machine-readable medium of claim 13, wherein the instructions executable by the processing resource further cause the machine to:

find an angular frequency of the data that minimizes a value of an envelope function of frequency domain amplitude responses of ghost wave functions associated with the positions of the plurality of seismic receivers.

17. A marine seismic source calibration assembly, comprising:

a first sensor cable and a second sensor cable;

at least one seismic source attached to the first sensor cable; and an array of seismic receivers attached to the second sensor cable positioned, based on maximizing a cost function, to enable removal of an interference effect of ghost signals originating from mirrored versions of the at least one seismic source that are received at the array of seismic receivers.

18. The marine seismic source calibration assembly of claim 17, wherein the cost function is related to an envelope function of frequency domain amplitude responses of ghost wave functions associated with predicted positions of the seismic receivers in the array for a specific position of the at least one seismic source.

19. The marine seismic source calibration assembly of claim 17, wherein the seismic receivers in the array are located an identical horizontal distance from the at least one seismic source, the horizontal distance comprises a trajectory parallel to a plane tangent to a spherical surface approximating a sea surface, the at least one seismic source and the seismic receivers in the array being located below the sea surface.

20. The marine seismic source calibration assembly of claim 17, wherein the array of seismic receivers comprises at least three hydrophones.

21. The marine seismic source calibration assembly of claim 17, wherein the at least one seismic source comprises at least one air gun.

22. The marine seismic source calibration assembly of claim 17, wherein the positions of the seismic receivers in the array are resolved for a specific position of the at least one seismic source.

* * * * *